Patented Apr. 15, 1969

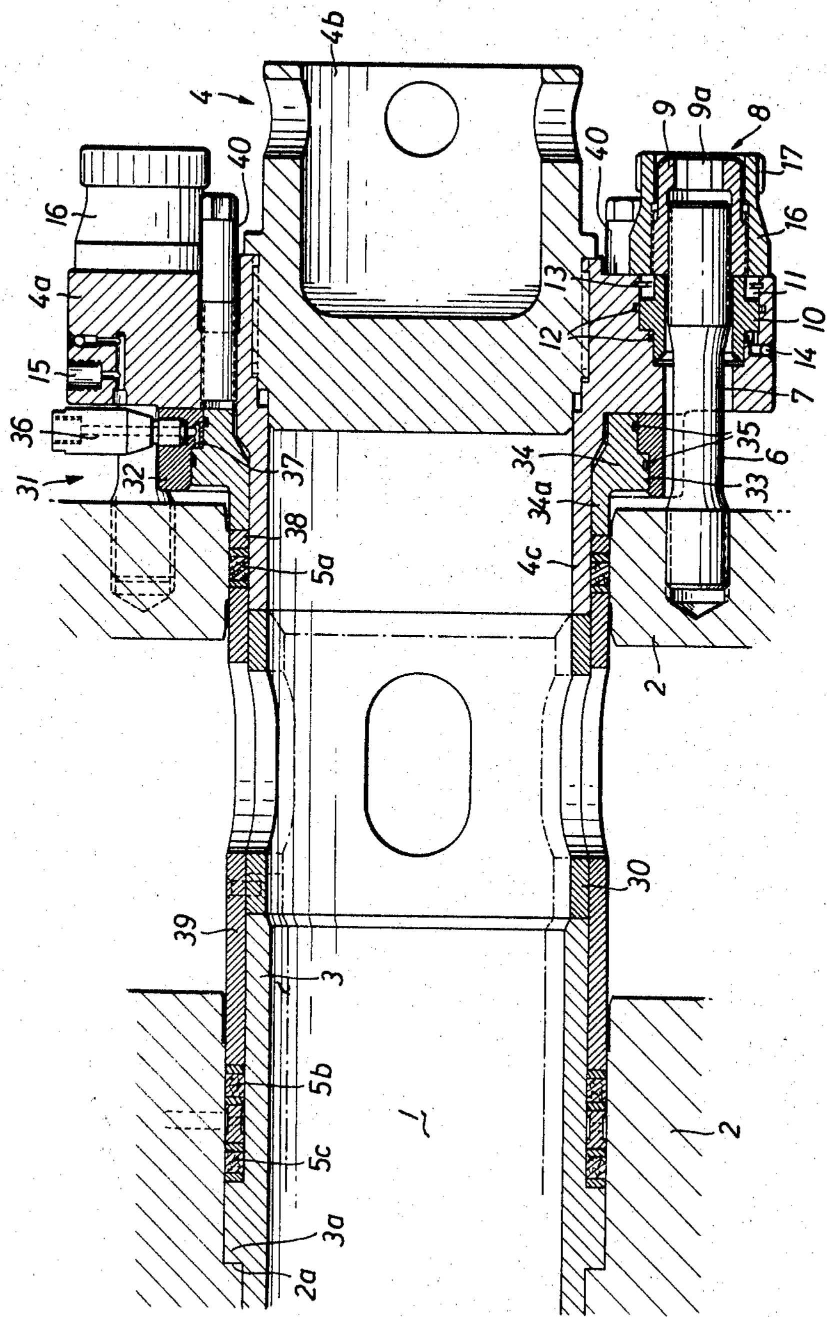
4b
4
40
40
9
9a
8
17
16
16
4a
13
11
12
10
15
14
7
36
35
6
34
31
32
37
33
34a
38
5a
4c
2
30
39
3
5b
1
2
5c
3a
2a United States Patent Office 3,438,334

3,438,334

PUMPS, IN PARTICULAR SCAVENGING PUMPS FOR USE IN DRILLING OPERATIONS

Martin Schaaf, Erkelenz, Rhineland, Germany, assignor to Maschinen- und Bohrgerate-Fabrik Alfred Wirth & Co., K.G., Erkelenz, Rhineland, Germany, a company of Germany Filed May 15, 1967, Ser. No. 638,265
Claims priority, application Germany, May 20, 1966, M 69,556
Int. Cl. F04b *21/08*
U.S. Cl. 103—216 5 Claims

ABSTRACT OF THE DISCLOSURE

The present invention relates to improved fixing and loading means for use in association with the packing glands of high-pressure drill rig scavenging pumps and comprises arrangements for producing the initial loading on the gland packings by fluid pressure and for maintaining such loading by mechanical devices which become operative when the fluid pressure is released, a similar arrangement being provided for fixing the external component associated with the packing gland.

The present invention relates to a pump, in particular to a positive displacement scavenging pump for use in drilling operations, there being one or more packings which can be trapped between the pump casing and a component, e.g. a cover or bush or the like, which can be detachably fixed on or in the casing.

Normally, a packing is held in place together with the component which is to be fixed, e.g. the cover of a pump chamber. However, the tightening up of a cover of this sort is done using screwed components, usually nuts and bolts.

The tightening up of packing and component in this fashion gives rise to a number of drawbacks in the above mentioned pumps. Using the conventional method of fixing, with several screws or bolts, there is the risk that because of unpredictable friction effects a determinate fixing load will not be achieved, and the requisite uniformity and concentricity in the fixed packing will be lacking. Also, the complete seal or only a part thereof, may be either too heavily or too lightly loaded, without this being initially apparent. Furthermore, the behaviour of the seal determines the way in which the component which is to be fixed, e.g. a cover or a sleeve etc., seats. In particular with changing pressures, of the kind occurring inside a pump casing, this gives rise to the undesired phenomenon of breathing at the component in question. This is something which must quite definitely not occur at a cylinder bushing.

All this applies even more strictly in the case of pumps for rotary drill rigs and the like, a field of application with which the invention is particularly concerned. Here, due to the high pressures encountered and the special circumstances of drilling operations, demands have to be satisfied which go far beyond normal requirements. The ever greater depths of the bores produced in modern drilling operations entail a corresponding increase in the operating pressures of the scavenging pumps, and this in turn means stricter requirements in terms of the individual fixing and packing points.

It is the aim of the invention to overcome the present drawbacks and to create a pump in which on the one hand it is possible to accurately and reliably tighten up the packing and on the other hand securely fix the associated component.

To achieve this end, the invention commences from the idea of tightening up the packing independently of the tightening up or drawing up of the component which is to be fixed in place. In accordance with the invention, the packing or packings in particular for use at the end of the stuffing box in a cylinder bushing or gland, are designed to be tightened up independently of the securing of the associated detachable component, by means of a loading device which is subjected to the effect of a pressurised medium. By appropriate selection of the loading from the pressure source for the medium, the desired fixing force for the packing can be very accurately and uniformly set over the full area.

A particularly advantageous design is achieved in accordance with the invention, in the context of the cylinder chamber of a positive displacement pump equipped with cylinder bushing and stuffing box packing. At this point, it is particularly with high pressure pumps that fixing and sealing conditions become critical problems. Thanks to the solution put forward in accordance with the present invention, the cylinder stuffing box packing can now be loaded, that is to say fixed, independently of any other influences of the kind hitherto at work when fixing the packing in combination with the cylinder bushing. On the other hand, at the same time the advantage is achieved that the cylinder bushing itself can be more securely fixed, quite independently of the packing.

The fixing force initially developed by the pressurised medium can also in fact be maintained by this pressurised medium. Over and above this, it is a feature of the invention that one or more adjustable mechanical elements can be employed to maintain the fixing force produced by the pressurised medium, when the pressure is released. With an arrangement of this kind, all that is necessary is a very brief application of fluid pressure. In order to apply this pressure, a hand pump can for example be used. The adjustable elements will in particular be clamping screws or the like, although other means such as wedges or cotters might well serve here.

In an advantageous embodiment, the invention provides an annular piston carried by an annular cylindrical component, which piston engages indirectly with the packing or packings. This constitutes a simple, compact and reliable design. All in accordance with the point of application in the pump, it may be convenient, in accordance with the invention, to equip the annular piston with an extension which engages between the components between which sealing is to be effected.

It is also within the scope of the invention to equip the fixing device with several individually operable pistons or the like, connected with one another through a common high-pressure line, these pistons acting for example on a thrust ring.

In accordance with a further feature of the invention, when using screws as the adjustable elements, these can be screwed into threaded holes in a component serving as a seating for the fixing device. The result is a compact but none the less handy construction.

The fixing device can furthermore, in accordance with the invention, bear directly against a cover or the like which closes off an opening in the casing, or may wholly or partially be incorporated into such cover. In this context, the cover for example can possess a cylindrical chamber for accommodating a stepped annular piston, and at the same time be provided with clamping or thrust screws which bear against this piston.

The detachable fixing or clamping in place of the component adjacent the packing or located in the vicinity thereof, for example a cover or a cylindrical bushing, can basically be effected in a variety of ways, e.g. by simple screw fixings. In accordance with the invention, a component of this sort can equally well be fixed in known fashion using a pressurised medium, and adjustable elements for maintaining the fixing force after the fluid pressure has been released are provided. Thus, for a cover, a cylinder bushing or another component, again the facility is created for rapidly effecting fixing with a uniform and precisely determined loading. All these advantages are of most especial significance in the pumps employed on drill rigs.

It should be mentioned at this point that a cover for casing apertures is known (see German specification 1,072,031), which possesses an external support section and an internal section, which cover is forced into contact, by the application of a pressurised medium between the two sections, with a packing ring extending around the particular aperture. Cover and packing cannot here however be fixed independently of one another, but exclusively in combination.

The invention will now be described making reference to the attached drawing which illustrates an embodiment of the invention but in no restrictive sense.

In the drawing, that part of the cylinder chamber 1 of a high-pressure positive displacement pump for drill rigs, which is disposed nearer the gland end and which contains a cylinder bushing 3 accommodated in the pump casing 2, is illustrated. The cylinder bushing 3 bears through a collar 3*a* against a shoulder 2*a* on the pump casing 2. Between the latter and the cylinder bushing 3, stuffing box packings 5*b*, 5*c* are provided, which, in accordance with the invention, can be fixed independently of the fixing of the cylinder bushing 3.

The opening in the pump casing 2 is closed off by a cover 4 which, in the embodiment illustrated, is constituted by an annular component 4*a* and a central component 4*b* screwed thereto. The cover has a spigot 4*c* which engages in the opening formed in the pump casing 2 and serves to fix the cylinder bushing 3 in place through an intermediate sleeve section 30.

In order to fix the cover 4 to the pump casing 2, twelve necked studs 6, screwed into twelve threaded holes in the casing 2 and passing through holes 7 in section 4*a* of the cover, are provided. Each stud is associated with a fixing device referred to in toto by the reference 8, as will be explained hereinafter. Onto the external threaded end of each stud 6, a sleeve 9 is screwed, which is provided with an internal hexagon 9*a* for an Allen key and constitutes an abutment for an annular stepped piston 10 which can slide in a stepped bore 11 formed in section 4*a* of the cover next to the hole 7. The bores 11, equipped with packings 12, thus constitute cylinder spaces to which, through a common line in the form of an annular passage 14, and via a connection 15, a pressurised medium, e.g. hydraulic oil, can be supplied from a source which is not illustrated, e.g. a hand pump. Connected to the pressure line is a manometer, which is not shown. Spring rings 13 secure the pistons 10 against dropping out, in the event that the sleeves 9 are unscrewed.

The sleeve 9 provided as an abutment for the piston 10 in each fixing device 8, is externally threaded over part of its length, and on this thread there is screwed a nut 16 which is either knurled, provided with toothing 17, or provided with flats.

The mode of operation of the device is as follows: By supplying a pressurised medium to the annular passage 14, the pistons 10 are loaded and the fixing force thus developed. Force is transmitted from the piston 10 through the abutment sleeve 9 and the studs 6, to the casing 2, and the cover 4 is forced in the direction of the casing. Once the predetermined fixing force, which can be ascertained on the manometer, has been reached, the nuts 16 carried loosely on the sleeves 9 are spun down by hand until they are finger-tight against the external flat face of the cylinder cover 4. The pistons 10 can then be unloaded, i.e. the hydraulic pressure released, and the nuts 16 then mechanically take over the maintaining of the hydraulically developed fixing force.

The releasing of this set-up is carried out in the reverse fashion, i.e. the pistons 10 are loaded by hydraulic pressure, until the nuts 16 can be spun back freely. In this way, it is possible in an advantageous manner to securely fix the cylinder bushing 3 independently of the associated packings, using a predetermined force, so that there is no possibility of any breathing at the packing.

For the separate fixing of the cylinder stuffing box packings, another fixing device indicated as a whole by the reference 31, is provided, which can be inserted in the indicated design between the outside face of the pump casing 2 and the cover 4. This device possesses a cylinder ring 32 which bears against section 4*a* of the cover, which has a stepped bore 33 and forms thus a cylinder in which an appropriately stepped annular piston 34, equipped with packings 35, can slide when the annular surfaces which it presents are subjected to pressurised fluid. The pressurised medium, e.g. hydraulic oil, is supplied by an appropriate source, possibly a hand pump, through a connection 36 to a passage 37 provided in the cylinder ring 32. The reduced end 34*a* of the piston 34 acts through the medium of a thrust ring 38 upon stuffing box packing 5*a* and also through a sleeve 39 upon the stuffing box packings 5*b* and 5*c*.

To tighten up the packings 5*a*, 5*b*, 5*c*, pressurised fluid is fed to the cylinder space through the connection 36. The piston 34 which is loaded as a consequence of this, thus exerts a pressure upon the packing arrangement, whilst the cylinder ring 32 reacts against the fixed cover section 4*a*. The pressure exerted by the fluid medium and therefore the consequent force, can be ascertained on a manometer connected to the high-pressure line, but not illustrated in the drawing. In this way, the stuffing box packings can be fixed absolutely centrally, with the requisite, precisely determined force.

With the advantageous design illustrated here, it is not necessary to maintain the fixing force through the agency of the pressurised medium supplied, and instead mechanical elements in the form of adjustable screws 40 are provided for this purpose. These screws are screwed into tapped holes in the cover 4*a* and once the predetermined fixing force, determined by the pressurised medium, has been reached, can be screwed up by hand until they hit the back face of the piston 34. At this point, the fluid pressure can be released, unloading the piston 34 and the screws 40 then maintain the fixing force.

To release the arrangement, the piston 34 is again supplied with an appropriate pressure, until the screws 40 are unloaded and can be spun back.

I claim:

1. A scavenging pump for drilling operations comprising a pump casing; a component detachably fixed to said casing; packing between said casing and said component; first fixing means for adjustably fixing said component to said casing; second fixing means for selectively compressing said packing which comprises an annular piston and cylinder ring, a connection for pressurized fluid to actuate said piston to compress said packing a predetermined amount, and adjustable mechanical means for maintaining said compression on said packing after the fluid presure is released, whereby said packing is compressed independently of fixing said component to said casing.

2. A pump as claimed in claim 1 wherein said annular piston has a reduced end which engages a thrust ring for said packing in an annular space defined by said casing and a spigot depending from said component.

3. A pump as claimed in claim 1 wherein said adjustable mechanical means is a series of thrust screws provided in tapped holes in said component, said annular piston being stepped and reactable against said cylinder ring which in turn abuts against said component.

4. A pump as claimed in claim 3 wherein said component is a cover which is adjustably fixed to said casing by said first fixing means and serves to seal an aperture in said casing.

5. A pump as claimed in claim 1 wherein said first fixing means comprises a pressurized fluid operated clamping device, and adjustable mechanical elements to maintain a clamping force created by said clamping device after it is deactivated between said casing and said component.

References Cited

UNITED STATES PATENTS

| | | | |
|---|---|---|---|
| 2,304,992 | 12/1942 | Foster | 103—216 XR |
| 2,499,614 | 3/1950 | Thornhill | 103—228 |

ROBERT M. WALKER, *Primary Examiner.*

U.S. Cl. X.R.

220—3